Figure 1:
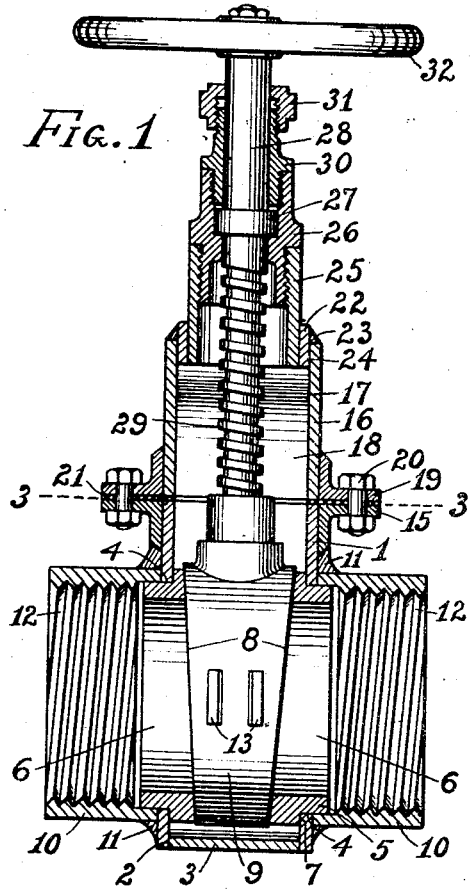

H. B. REDDING.
STEEL PLATE GATE VALVE.
APPLICATION FILED MAY 7, 1915.

1,213,259.

Patented Jan. 23, 1917.

Inventor
H. B. Redding
By G. H. Dunstan
his Attorney

UNITED STATES PATENT OFFICE.

HARRY B. REDDING, OF CLEVELAND, OHIO, ASSIGNOR, BY DIRECT AND MESNE ASSIGNMENTS, OF ONE-FOURTH TO M. A. FRITTS, ONE-HALF TO D. A. DIEMERT, AND ONE-FOURTH TO THE CLEVELAND STEEL VALVE CO., OF CLEVELAND, OHIO, A CORPORATION OF OHIO.

STEEL-PLATE GATE-VALVE.

1,213,259. Specification of Letters Patent. Patented Jan. 23, 1917.

Application filed May 7, 1915. Serial No. 26,463.

*To all whom it may concern:*

Be it known that I, HARRY B. REDDING, a citizen of the United States, residing at Cleveland, in the county of Cuyahoga and State of Ohio, have invented certain new and useful Improvements in Steel-Plate Gate-Valves, of which the following is a specification.

This invention relates to valves for controlling the flow of liquids or gases, and known as gate, globe and angle valves.

The main object of the invention is to provide valves of the above character, so designed that the bodies thereof can be constructed of rolled steel plates, which are cut and bent in suitable shapes for forming the bodies and united by means of the electric or oxy-acetlyene welding process. By constructing valve bodies in the manner stated, not only is the cost of manufacture less than cast valves, but they are lighter in weight, will withstand greater pressure, and the danger and loss due to hidden defects in the castings is eliminated.

With the above and other objects in view as will be understood, the invention will be hereinafter fully described, reference being had to the accompanying drawings which illustrate a preferred embodiment thereof, and the novel feature of the invention will be distinctly pointed out in the appended claims.

In the drawings, like characters of reference indicate corresponding parts.

Figure 2:
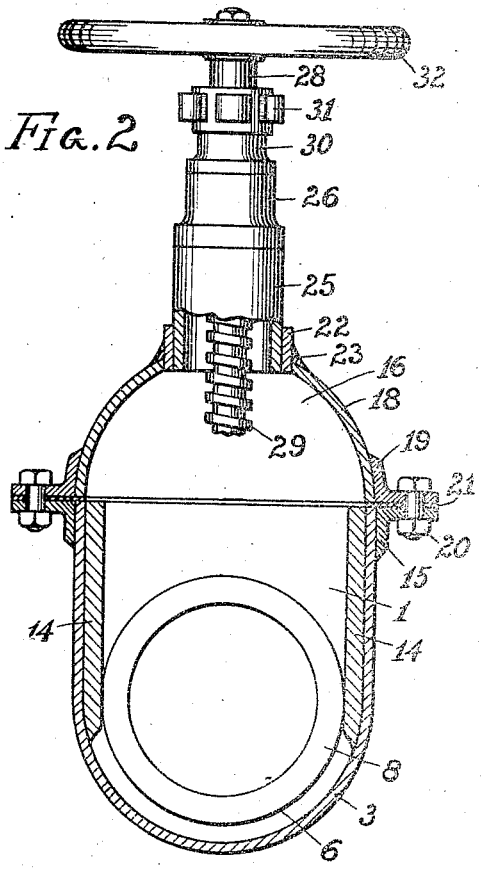
Figure 3:
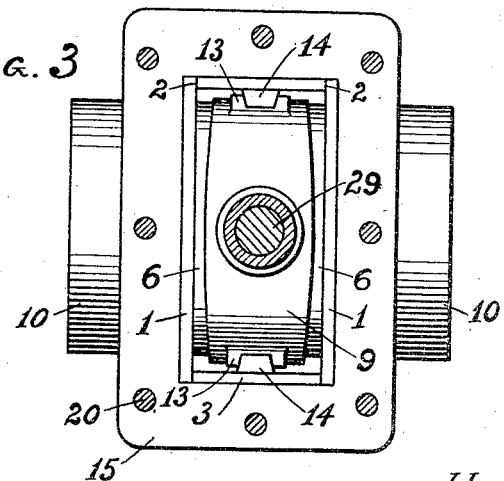

Figure 1 is a sectional elevation of a gate valve constructed in accordance with my invention, Fig. 2 is a similar view at a right angle to that of Fig. 1, and Fig. 3 is a sectional plan view, taken on line 3—3 of Fig. 1.

Referring to the drawings, the lower portion of the valve body is formed of a pair of similar shaped steel side plates 1, which are arranged in spaced relation and united at 2, by the electric or oxy-acetylene welding process, to the edges of a U-shaped steel strip 3. The side plates 1 are provided with openings 4 for receiving the reduced diameters or necks 5 of steel rings 6, the shoulders 7 of which abut the inner surfaces of the plates. The inner faces 8 of said rings are inclined as shown to form seats for the opposite faces of a tapering disk or gate 9. It will be noted that the necks 5 of the seating rings extend beyond the side plates 1, and fitting over their projecting ends are steel tubular members 10, which abut the outer faces of said plates. Said tubular members are firmly connected to said rings, and these parts to the side plates, by means of the electric or oxy-acetylene welding process, as indicated at 11. As will be understood, the tubular members 10 may be threaded internally as shown at 12, or externally, or their outer ends provided with flanges, for making the usual pipe connections. The tapering disk or gate 9 is adapted to move vertically between the faces of the seating rings 6, and is guided by means of pairs of lugs 13, which slidably engage steel guide bars 14 arranged centrally of the steel strip 3 and welded thereto by the electric or oxy-acetylene process. Surrounding the upper open end of the lower portion of the valve body, and solidly fixed thereto by the electric or oxy-acetylene process, is a rectangular flange 15 formed of ordinary angle iron. This flange strengthens the lower portion of the valve body and also serves to connect the upper portion of the valve body thereto.

The upper portion of the valve body is constructed of plate steel in a similar manner as the lower portion, and consists of a pair of semi-circular side plates 16, which are electrically or oxy-acetylene welded to the edges 17 of a dome strip 18. A flange 19, corresponding to the flange 15, is welded to the lower open end of the upper portion of the valve body, and these flanges are removably connected together by means of bolts 20, a thickness of packing 21 therebetween assuring a tight joint. Centrally of the dome strip is an opening for receiving a bushing 22, which is welded thereto and to the side plates 16, by the electric or oxy-acetylene process, as indicated at 23, and to the inside of said bushing at 24, is welded in the same manner, a sleeve 25. A plug 26 is screwed into the upper end of said sleeve to provide a bearing for the collar 27 of the valve stem 28, which is threaded at 29 for engaging the gate 9 to cause vertical movement thereof when the valve stem is rotated. The usual stuffing box 30 is threaded into the plug 26, and a gland nut 31 provided therefor. A suitable hand wheel 32 being fixed to the valve stem for operating the same.

It will be seen from the foregoing description and accompanying drawings, that a valve of neat outline can be constructed of rolled steel or wrought iron cut and bent to shape, and joined together by the electric or oxy-acetylene welding process, and that a valve so made will be comparatively light in weight but able to withstand great pressure. Although a gate valve has been illustrated and described, it is to be understood that this method of manufacturing valves from plate steel is applicable to globe and angle valves. Also that slight changes in the details of construction may be made within the scope of the claims.

Having fully described my invention, what I claim is:

1. A valve body formed of side plates and a strip, the side plates being welded to the strip, the side plates having openings therethrough, and tubular members having their ends fitting against and being welded to said side plates in alinement with the openings, substantially as described.

2. A valve body formed of side plates and a strip, the side plates being welded to the strip, the side plates having openings therethrough, rings inserted in the openings of the side plates and having shoulders abutting the inner faces thereof, tubular members fitting over the outer ends of said rings and abutting the outer faces of the side plates, and said tubular members being welded to the rings and to the side plates, substantially as described.

3. A valve body formed of side plates and a strip, the side plates being welded to the strip, the side plates having openings therethrough, rings inserted in the openings of the side plates and having shoulders abutting the inner faces thereof, tubular members fitting over the outer ends of said rings and abutting the outer faces of the side plates, said tubular members being welded to the rings and to the side plates, the rings having their inner faces inclined, and guide bars for the valve gate welded to said strip between said inclined faces of the rings, substantially as described.

In testimony whereof I affix my signature.

HARRY B. REDDING.